UNITED STATES PATENT OFFICE 2,301,412

TITANIUM OXIDE PRODUCTION

John Lewis Keats and Henry Moroni Stark, Wilmington, Del., assignors to E. I. du Pont de Nemours & Company, Wilmington, Del., a corporation of Delaware No Drawing. Application July 6, 1939,
Serial No. 283,053

5 Claims. (Cl. 23—202)

This invention relates to the production of titanium oxide, and more particularly to a process for accelerating the hydrolysis of titanium salt solutions used in the manufacture of pigment-useful titanium oxide.

More specifically, the invention relates to a process for accelerating the hydrolysis of such titanium salt solutions, and particularly titanium sulfate, under conditions which are highly conducive for effecting conversion of the hydrolysis precipitate to rutile crystalline state and at calcination temperatures of relatively low order.

Titanium oxide pigments are produced from titanium salt solutions (the sulfate, chloride, etc.) by many well-known processes. Use of titanium sulfate solutions in such production is particularly favored in industrial applications in view of the fact such solutions are more easily prepared, the more common titanium-bearing mineral, ilmenite, being more readily amenable to dissolution in sulfuric acid. Sulfate solutions are also of less corrosive character than chloride solutions and avoidance of serious corrosion problems presented by chloride processes is thus had.

Titanium sulfate solutions on hydrolysis produce anatase titanium oxide, whereas solutions of titanium chloride (upon observance of certain carefully chosen conditions) hydrolyze to produce rutile. Of the three occurring crystalline modifications of titanium oxide, rutile possesses the highest refractive index and therefore the highest potential hiding power. This high hiding power only exists, however, when the individual particles of the titanium oxide pigment are relatively uniform and minute in character, and, preferably, smaller than exhibited by pigment anatase having certain optimum hiding power values. In such prior rutile pigment production, resort to calcination temperatures of a relatively high order, i. e., of substantially 1000° C. or higher, has been considered essential, and this even though use of such temperatures exerts an undesired degradation of and sacrifice in the strength and color of the final product.

We have found that an excellent, high quality rutile titanium oxide pigment of relatively small and uniform particle size can be obtained in increased yields from titanium salt solutions, and particularly titanium sulfate, through use of a novel type of hydrolysis accelerating agent and calcination temperatures of a relatively low order, i. e., substantially below 1000° C.

In accordance with the invention, therefore, it is among its specific objects to provide for the production of a substantially rutile crystalline titanium oxide pigment, the individual particles of which are characteristically uniform and relatively minute in size, which pigment will desirably exhibit the highest potential hiding power and be of requisite commercial high strength and color. A further specific object is to provide an improved process for the production of rutile titanium oxide from titanium salt solutions, and particularly titanium sulfate, through use of an improved and novel type of nucleating agent. An additional object of the invention is to provide a process for hydrolyzing titanium salt solutions, and particularly titanium sulfate, under such conditions that high yields of titanium oxide are obtained. A further object is to obtain a hydrolysis precipitate adapted to convert the anatase to the rutile crystalline modification at comparatively low calcining temperatures.

These and other objects are attainable in this invention which comprises seeding a hydrolyzable titanium salt solution with a special and highly effective nucleating agent, comprising suitably conditioned stannic oxide.

The novel nucleating sol of this invention possesses many distinguishing features over prior nucleating agents, not only in respect to physical properties, but in seeding activity as well. It comprises a more or less dilute, colloidally dispersed, peptized hydrous stannic oxide suspension. Peptization thereof is preferably effected through suitably conditioning precipitated stannic hydrate by treating the same with an acidic agent, such as hydrochloric acid. In describing the invention, illustration will be given of one preferred embodiment in which hydrolysis is effected of a titanium sulfate solution in the presence of peptized stannic oxide as a nucleator with hydrochloric acid as a peptizator:

In such preferred adaptation, a nucleating seed, peptized hydrous tin oxide, is prepared by precipitating stannic hydrate from an aqueous solution of stannic chloride by neutralizing said solution with sodium hydroxide (or other alkali solution such as potassium or ammonium hydroxide, carbonate, etc.). The resultant stannic hydroxide precipitate is then filtered, washed thoroughly to remove all chloride ions present, and, in purified state, admixed with sufficient hydrochloric acid as will provide a slurry mass at about 0.5 N. Such acid suspension is then preferably heated to an elevated temperature (of substantially 50° C. or higher) and there maintained for a relatively short period of time (15 to 20 minutes) to suitably condition the hydrate and develop desired nucleating properties. The peptized seed suspension is then cooled, preferably quickly, to room temperature or lower, after which the same may be immediately used or stored, as desired, for subsequent use.

The amount of seed material required for effecting nucleation of the titanium sulfate solution will be found to be relatively small or minor. An effectively useful amount comprises a quantity equal to about 3–5% (as $SnO_2$) on the basis of the $TiO_2$ present, this amount being conveniently mixed with the solution prior to hydrolysis. Hydrolysis can then be effected in the usual and conventional manner.

By use of our novel type of nucleating seed, it will be found a materially increased yield of precipitated titanium oxide from the hydrolysis results within a relatively shorter period of time. Thus, a yield in excess of substantially 75 or 85% of $TiO_2$ results after a period of three hours of hydrolysis, whereas, in a comparable hydrolysis, but with an unseeded solution, a yield not to exceed 30 or 40% obtains. Again, when the anatase precipitate from such titanium sulfate hydrolysis is subjected to calcination, it will be found that use of said nucleating agent enables resort to calcination temperatures of a much lower order, e. g., a temperature of 850° C., affording complete conversion of said precipitate to rutile, while a temperature of substantially 750° C. affords at least 60% conversion. These results obtain even though conversion of the raw pigment is effected in the presence of small amounts of a soluble alkali metal salt, such as a sulfate or carbonate, and particularly potassium sulfate, a most useful agent, known to strongly inhibit rutile formation. Thus, conversion of an anatase precipitate to rutile is effected without recourse to relatively high calcination temperatures which would otherwise undesirably affect the pigment properties and diminish particularly the strength and color values of the final product.

To a more complete understanding of the invention, the following specific examples are given. These, however, are merely illustrative and not in limitation of the invention:

Example I

Peptized hydrous stannic oxide was prepared as follows: 232 grams stannic chloride ($SnCl_4.5H_2O$) was dissolved in water and neutralized by running the solution into a solution of sodium hydroxide (1.5 normal) until the pH of the resulting suspension was 4.3. The precipitated stannic hydroxide was filtered and washed to remove chloride ions and was then reslurried with water. A solution of HCl of 1.0 normal concentration was added to the slurry in an amount sufficient to make the HCl concentration of the resulting suspension 0.5 normal. The acid suspension was then heated to 80° and quickly cooled to room temperature.

1100 cc. of peptized stannic hydrate suspension prepared as above described was added to 2200 cc. of a solution of titanium sulfate. The $SnO_2$ equivalent of the stannic hydrate was equal to 5% of the $TiO_2$. The concentration of the titanium sulfate solution after addition of the stannic hydrate suspension was 183 grams $TiO_2$ per liter, 61.5 grams iron per liter, and 556 grams $H_2SO_4$ per liter. The seeded solution was heated at a temperature of 105° for a period of three hours. At the end of the hydrolysis 88% of the $TiO_2$ originally present in the solution was found in the precipitate.

The raw pigment thus produced was characterized by the tendency to convert to the rutile crystal form at relatively low calcining temperatures. Thus, it converted completely to rutile at 850° and was 60% rutile after calcining at 750°. The conversion to rutile was complete after calcining at 850° even when the raw pigment was treated with potassium sulfate.

Example II 370 g. $SnCl_4.5H_2O$ was dissolved in water and the solution neutralized to a pH of 6.2 by the addition of 2760 cc. of 1.5 N. NaOH. The stannic hydrate precipitate was washed and then peptized by adding HCl. This batch of seed was given no heat treatment.

The peptized stannic hydrate was added to the titanium sulfate solution before the beginning of hydrolysis. The amount of stannic hydrate added was equal to 5% as $SnO_2$ on the $TiO_2$ basis. The composition of the solution during hydrolysis was $TiO_2$ = 183 grams per liter
Fe = 61.5 grams per liter
total $H_2SO_4$ = 556 grams per liter The yield on hydrolysis (3 hrs. boiling) was 77.8%. Unseeded solutions yield about 30–40% when boiled the same period of 3 hrs.

The raw pigment from the above procedure converted to rutile completely on calcination at 850° C. and was found to be 60% converted after calcination at 750° C.

In addition to the desired increase in yield of titanium oxide which our invention affords, the feature of lowering the temperature required for conversion of the raw pigment to rutile will be found to more advantageously accrue, and in the optimum, when said peptized stannic oxide is employed during hydrolysis of the titanium solution rather than subsequently thereto, as by adding said stannic oxide to a raw precipitated pigment prior to calcination. The ensuing data illustrate the comparative results in such instances:

*Seeding hydrolysis and raw pigment with $SnO_2$*

| Seed addition | Crystal form of product after calcination at— | | | |
|---|---|---|---|---|
| | 750 | 850 | 950 | 1000 |
| (1) HCl-peptized stannic oxide (5%) added to titanium sulfate solution before hydrolysis. | 60% rutile | Rutile. | | |
| (2) Seed addition same as (1) raw pigment treated with 1% $K_2SO_4$. | | Rutile+trace anatase. | | |
| (3) HCl peptized stannic oxide (5%) added to wet raw pigment. | | | Anatase | Rutile. |
| (4) Same as (3) using different stannic oxide seed preparation (5%). | | | 10% rutile, 90% anatase. | Rutile. |
| (5) Control—Hydrolysis product from U. S. Reissue Pat. #18,790 seeding procedure. No salt treatment. | | | Anatase | Rutile+trace anatase. |

The above data indicate that the addition of peptized stannic oxide to the wet raw pigment to the extent of about 5% on the pigment basis exerts a relatively slight lowering of the temperature of conversion to rutile. On the other hand, when such agent is employed in the hydrolysis, the temperature of conversion becomes lowered very markedly (100 to 200° C.) by the addition of such agent in the same proportion to the titanium sulfate solution prior to hydrolysis.

While specific methods, agents and conditions have been employed in the specific examples above, obviously the invention is not limited thereto, such examples merely representing certain preferred and specific adaptations of the invention. Thus, while the preferred conditioning medium for the stannic hydrate, hydrochloric acid, has been employed at specific concentrations, these are variable and use of acid concentrations ranging within, say, from about 0.05 N to about 1.0 N may be resorted to. Also, while peptization is preferably effected at elevated temperatures ranging from, say, 50° C. to about 90 or 100° C., effective seeds may also be obtained by merely allowing the hydrate to stand in the presence of cold hydrochloric acid at about 0.5 N concentration. Similarly, while hydrochloric acid comprises a preferred type of peptizator, other acidic media, or mixtures thereof, may be used, and particularly such other monobasic acids as nitric, perchloric, perbromic, periodic, hydrobromic, hydriodic, acetic. Additionally, such conditioning agents as sulfuric acid, glycollic acid, propionic acid, butyric acid, maleic acid, or salts, such as sodium sulfate, aluminum sulfate, sodium acid sulfate, may also be used to produce the suspension or seed. The term "conditioning agent," being accordingly intended to embrace all such useful types of acids or salts, whether inorganic or organic, and whether capable of a peptizing or non-peptizing function.

Again, while the invention has been illustrated in a preferred adaptation in which seeding of titanium sulfate solutions has been effected, our stannic oxide nucleating sol may also be used in effecting hydrolysis of other solutions of titanium salts, such as the chloride, nitrate, fluoride, etc. Also, while stannic chloride comprises a preferred useful compound from which stannic hydrate may be obtained, said hydrate may be precipitated from other soluble salts of tin, and through neutralization or otherwise, as from aqueous solutions of stannic bromide, stannic sulfate, stannic fluoride, etc.

When said conditioned stannic oxide is employed as a seeding agent in the hydrolysis of titanium salt solutions and the resultant TiO₂ precipitate is subjected to calcination at temperatures not exceeding substantially 850° C., the pigment product obtained will consist of substantially rutile titanium oxide of relatively small uniform particle size average. In general, its average particle size will not exceed substantially 0.6 microns in diameter, and will usually and preferably range from about 0.25 to below 0.45 microns. In such state it will possess the highest titanium oxide hiding power value and requisite high tinting strength and color values as well.

We claim as our invention:

1. A process for hydrolyzing a titanium salt solution to obtain a TiO₂ precipitate which converts to rutile on calcination at a temperature below substantially 1000° C. which comprises conducting hydrolysis thereof in the presence of a small amount of a nucleating agent comprising a suspension of colloidally dispersed, peptized, hydrous stannic oxide obtained by precipitating a stannic hydrate from a solution of a soluble tin salt, washing the resulting precipitate to render the same substantially free of electrolytes, mixing the resulting purified product with a peptizing, monobasic acid medium at a concentration ranging from about 0.05 N. to about 1.0 N., and then maintaining the resulting mixture at a temperature of from about 50° C. to about 100° C. for a relatively short period of time to develop the nucleating characteristics of said hydrous stannic oxide.

2. A process for hydrolyzing a titanium sulfate solution to obtain a TiO₂ precipitate which converts to rutile on calcination at a temperature below substantially 1000° C. which comprises conducting hydrolysis thereof in the presence of a small amount of a nucleating agent comprising a suspension of colloidally dispersed, peptized, hydrous stannic oxide obtained by neutralizing an aqueous solution of a soluble tin salt to precipitate a stannic hydrate, washing the resulting precipitate to render the same substantially free from electrolytes, mixing the resulting purified product with a monobasic acid peptizing agent at a concentration ranging from about 0.05 N. to about 1.0 N., and then maintaining the resulting mixture at a temperature of from about 50° C. to about 100° C. for a relatively short period of time to develop the nucleating characteristics of said hydrous stannic oxide.

3. A process for producing a rutile titanium oxide pigment comprising hydrolyzing a titanium salt solution in the presence of a small amount of a nucleating agent comprising a suspension of colloidally dispersed, peptized, hydrous stannic oxide obtained by precipitating a stannic hydrate from a solution of a soluble tin salt, followed by washing of the resulting precipitate to render the same substantially free from electrolytes, after which said purified product is mixed with a monobasic acid peptizing agent at a concentration of about 0.05 N. to about 1.0 N., maintaining the resulting mixture at a temperature of from about 50 to about 90° C. for a period of about 15–20 minutes to develop the nucleating characteristics of said hydrous stannic oxide, recovering the precipitate obtained from said hydrolysis and then calcining the same at a temperature not exceeding substantially 850° C.

4. A process for obtaining an improved rutile titanium oxide pigment comprising hydrolyzing a titanium sulfate solution in the presence of from about 3 to about 5%, on the TiO₂ basis, of peptized stannic oxide prepared by precipitating a stannic hydrate through neutralization from a soluble tin salt, washing the resulting precipitate to render the same substantially free from electrolytes, mixing the resulting purified product with an amount of hydrochloric acid sufficient to provide a concentration of about 0.05 N. to about 1.0 N., maintaining the resulting mixture at a temperature of from about 50 to about 90° C. for about 15–20 minutes to develop the nucleating characteristics of said stannic oxide, after hydrolysis of said titanium sulfate solution purifying and recovering the resulting anatase titanium oxide hydrolysate, and then calcining the same at a temperature not exceeding substantially 850° C.

5. A process for obtaining an improved rutile titanium oxide pigment through conversion of anatase, at a temperature below substantially 1000° C., comprising hydrolyzing a titanium sulfate solution in the presence of a small amount of a nucleating agent comprising a suspension of colloidally dispersed, peptized, hydrous stannic oxide, obtained by precipitating a stannic hydrate by neutralizing a solution of a soluble tin salt with an alkali, washing the resulting precipitate to remove electrolytes therefrom, mixing the resulting purified product with a monobasic acid peptizing agent at a concentration of about 0.05 N. to about 1.0 N., and then conditioning its nucleating characteristics by maintaining said mixture for a relatively short period of time at a temperature ranging from substantially 50–90° C., after hydrolysis of said titanium sulfate solution recovering and washing the anatase hydrolysate, and then calcining the same at a temperature not in excess of subtantially 850° C.

JOHN LEWIS KEATS.
HENRY MORONI STARK.